(12) United States Patent
Bachmaier et al.

(10) Patent No.: US 9,587,609 B2
(45) Date of Patent: Mar. 7, 2017

(54) THERMALLY VOLUME-NEUTRAL STROKE TRANSMITTER, IN PARTICULAR FOR METERING VALVE WITHOUT HYDRAULIC COMPENSATOR

(75) Inventors: Georg Bachmaier, München (DE); Gerit Ebelsberger, München (DE); Bernhard Fischer, Töging A. Inn (DE); Michael Höge, Feldkirchen (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 674 days.

(21) Appl. No.: 13/810,170

(22) PCT Filed: Jul. 5, 2011

(86) PCT No.: PCT/EP2011/061267
§ 371 (c)(1),
(2), (4) Date: Jan. 14, 2013

(87) PCT Pub. No.: WO2012/007311
PCT Pub. Date: Jan. 19, 2012

(65) Prior Publication Data
US 2013/0112781 A1    May 9, 2013

(30) Foreign Application Priority Data
Jul. 15, 2010  (DE) .................. 10 2010 027 278

(51) Int. Cl.
*F16K 31/122* (2006.01)
*F02M 63/00* (2006.01)
(Continued)

(52) U.S. Cl.
CPC ........ *F02M 63/00* (2013.01); *F02M 63/0026* (2013.01); *F16K 31/1225* (2013.01);
(Continued)

(58) Field of Classification Search
CPC .. F02M 63/00; F02M 63/026; F02M 2200/70; F02M 2200/703; F02M 2200/707;
(Continued)

(56) References Cited

U.S. PATENT DOCUMENTS 2,089,756 A * 8/1937 Moller ............................ 303/82
4,855,604 A * 8/1989 Riahi .......................... 250/492.2
(Continued)

FOREIGN PATENT DOCUMENTS

CN          1447911      10/2003
DE       76 03 126 U1    7/1976
(Continued)

OTHER PUBLICATIONS

Office Action for German Patent Application No. 10 2010 027 278.7; dated Feb. 2, 2011.
(Continued)

*Primary Examiner* — Mary McManmon
*Assistant Examiner* — Ian Paquette
(74) *Attorney, Agent, or Firm* — Slayden Grubert Beard PLLC (57) ABSTRACT

In addition to liquid in a thermal volume-neutral stroke transmitter, first and/or second displacement body(ies) is/are positioned in the stroke transmitter, for displacing the liquid. These three materials in the closed system are designed so that the stroke transmitter remains pressure-free during temperature changes.

22 Claims, 3 Drawing Sheets

(51) Int. Cl.
G01F 13/00 (2006.01)
G01F 15/02 (2006.01)
G01F 15/04 (2006.01)

(52) U.S. Cl.
CPC .............. G01F 13/00 (2013.01); G01F 15/02 (2013.01); G01F 15/04 (2013.01); *F02M 2200/703* (2013.01); *F02M 2200/707* (2013.01)

(58) Field of Classification Search
CPC ... F02M 51/0603; F02M 61/167; F16K 31/004; F16K 31/007; F16K 31/12; F16K 31/122; F16K 31/1221; F16K 31/1225; F16K 31/126; G01F 15/02; G01F 15/04
USPC .......................................................... 251/57
See application file for complete search history.

(56) References Cited

U.S. PATENT DOCUMENTS

| | | | | |
|---|---|---|---|---|
| 6,062,532 | A * | 5/2000 | Gurich et al. | 251/57 |
| 6,685,105 | B1 * | 2/2004 | Ruehle et al. | 239/102.1 |
| 6,719,264 | B2 * | 4/2004 | Mattes | 251/57 |
| 7,040,550 | B2 * | 5/2006 | Hohl et al. | 239/102.2 |
| 7,062,974 | B2 | 6/2006 | Boehler et al. | |
| 7,077,377 | B2 * | 7/2006 | Schurz | 251/54 |
| 7,669,783 | B2 | 3/2010 | Fischer et al. | |
| 2002/0084723 | A1 * | 7/2002 | Kawazoe | 310/348 |
| 2003/0127615 | A1 | 7/2003 | Fischer et al. | |
| 2004/0020300 | A1 | 2/2004 | Boehler et al. | |
| 2005/0103587 | A1 * | 5/2005 | Fischer et al. | 188/297 |
| 2006/0012265 | A1 * | 1/2006 | Bachmaier et al. | 310/316.01 |

FOREIGN PATENT DOCUMENTS

| | | |
|---|---|---|
| DE | 277522 A1 | 4/1990 |
| DE | 19646847 A1 | 6/1997 |
| DE | 199 40 054 A1 | 3/2001 |
| DE | 100 31 120 A1 | 1/2002 |
| DE | 100 39 424 A1 | 2/2002 |
| DE | 10 2004 053 672 A1 | 5/2006 |
| DE | 10 2007 016 866 A1 | 10/2008 |
| DE | 102010027278.7 | 7/2010 |
| EP | 1 519 037 A1 | 3/2005 |

OTHER PUBLICATIONS

International Search Report for PCT/EP2011/061267 mailed Jan. 4, 2012.
Office Action mailed Jan. 8, 2014 in corresponding European Application No. 11732408.7.
Office Action issued Jun. 5, 2014 in corresponding Chinese Patent Application No. 201180034904.0.

* cited by examiner

FIG 3

FIG 4

THERMALLY VOLUME-NEUTRAL STROKE TRANSMITTER, IN PARTICULAR FOR METERING VALVE WITHOUT HYDRAULIC COMPENSATOR

CROSS REFERENCE TO RELATED APPLICATIONS

This application is the U.S. national stage of International Application No. PCT/EP2011/061267, filed Jul. 5, 2011 and claims the benefit thereof. The International Application claims the benefit of German Application No. 10 2010 027 278.7 filed on Jul. 15, 2010, both applications are incorporated by reference herein in their entirety.

BACKGROUND

Described below is a stroke transmitter, including use in a metering valve.

Figure 1:
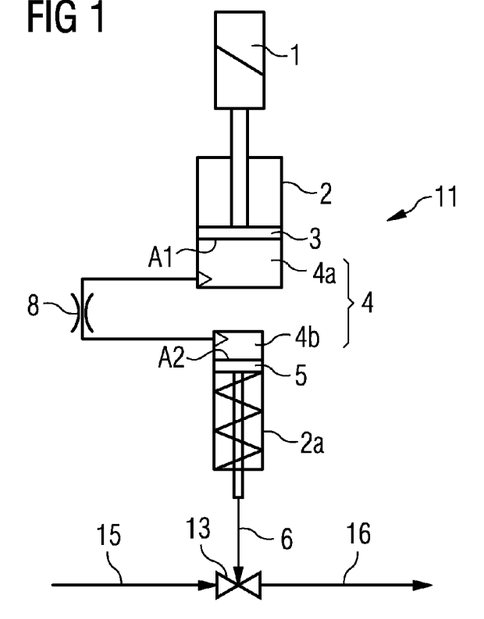
FIG. 1 is a schematic diagram of a first exemplary embodiment of a metering valve.

FIG. 1 shows an exemplary embodiment of a known metering valve. A first piston having the surface area A1 is guided in a first cylinder and is driven directly by an actuator. A further piston having the surface area A2 is connected to a valve needle. The volume between the pistons is filled with a fluid, specifically oil in most cases, and connected to a channel. A throttle is integrated into this section in order to suppress vibrations. When the actuator moves, a certain volume of fluid, specifically $x_1 * A_1$, is displaced by the first piston and also moves the second piston through the bore, where $x_2 = x_1 * A_1 / A_2$. A deflection amplification, specifically the ratio of actuator stroke to needle stroke, can be achieved as a function of the chosen area ratios. Fluid can be metered quickly and precisely with the aid of a connection between a high-speed piezoelectric actuator and a stroke transmitter according to FIG. 1. This requirement will become more and more important in the future in the case of internal combustion engines that operate on gas or gasoline.

Figure 2:
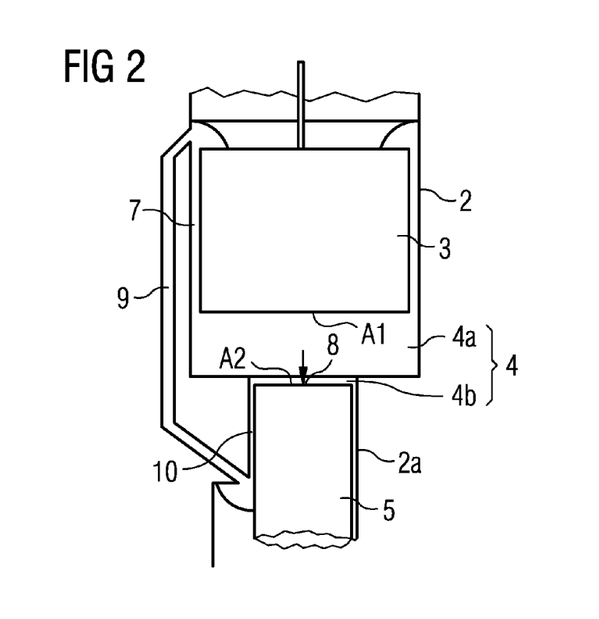
FIG. 2 is an exemplary embodiment of a stroke transmitter.

FIG. 2 shows a more detailed known stroke transmitter concept. When an actuator (not shown in the figure) is actuated, it presses a first piston, as a result of which the pressure in the hydraulic volume increases and moves a second piston. The second piston opens the metering valve, for example. On account of the operating principle of the system, oil is discharged through annular gaps. This leads to a diminishing volume over time and consequently to a loss of stroke, which is also referred to as drift. A further disadvantage is the friction between the pistons and the cylinders. This friction leads on the one hand to a stroke loss and on the other hand a piston can seize or become immovably jammed in a cylinder. The friction can be reduced in the known manner by coating the contact surfaces, usually with diamond-like carbon (DLC). However, this is time-consuming and expensive and it has so far not been possible to eliminate stroke loss as a consequence of gap flow.

Figure 3:
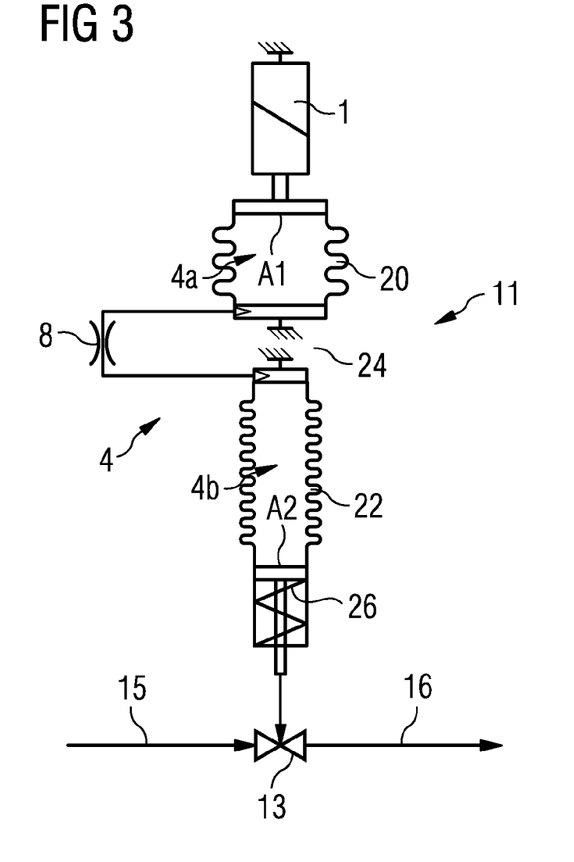
FIG. 3 is a schematic diagram of a second exemplary embodiment of a metering valve.

FIG. 3 shows a metering valve based on a further concept for a hydraulic stroke transmitter. The hydraulic fluid is contained in hermetically sealed metal bellows which together form the hydraulic volume. The pistons are welded on as end faces. They no longer need to move in a hydraulic fluid. There is no piston friction in the hydraulic volume, and the gap flow problem is likewise eliminated. However, a concept of this kind still continues to have the following disadvantage: A change in temperature causes the volume of metal bellows to change in accordance with the associated volume expansion coefficient. The enclosed fluid has a different volume expansion coefficient. Hydraulic oils, which may be employed in this context, typically have a very high volume expansion coefficient. This leads to the undesired effect that the fluid expands to a greater extent than a metal bellows. As a result the oil needs more volume when the temperature increases. This leads to a pressure increase in the hydraulic volume 4 and ultimately to an undesired leakage when the valve is finally forced open.

SUMMARY

A thermally volume-neutral stroke transmitter is described below for a metering valve for rapid and precise metering of a large volume of a fluid, in particular a gas. The intended aim is for the metering valve to be thermally volume-neutral and require no hydraulic compensator. Equally it is aimed to avoid an additional clearance compensation element for an actuator.

According to a first aspect, a stroke transmitter is provided, wherein a first volume which is variable by a first effective cross-sectional area A1 and is encompassed by a first housing component and a second volume which is variable by a second effective cross-sectional area A2 and is encompassed by a second housing component is filled with a fluid, are produced in a fluid exchange with one another by a throttling port in such a way that a stroke of the second effective cross-sectional area corresponds to the product of a stroke of the first effective cross-sectional area with a ratio formed from the first effective cross-sectional area to the second effective cross-sectional area, wherein an overall housing externally delimits a total volume made up of the sum of first volume and second volume. At least one displacement element is positioned in the total volume, and the overall housing, the fluid and all of the displacement elements are coordinated to complement one another in such a way that a change in volume of the overall housing caused by a change in temperature corresponds to a combined change in volume, caused by the change in temperature, of the fluid and of all of the displacement elements.

First and second housing component in combination produce the overall housing. In addition a line of the throttling port can be considered as a third housing component of the overall housing. According to the functional principle of the stroke transmitter, given a constant temperature, a volume of an overall housing and of the fluid encompassed by the housing is constant for each stroke owing to the incompressibility of the fluid.

According to a second aspect, a stroke transmitter is used for actuating a metering valve, wherein the first effective cross-sectional area is mechanically coupled to a piezoelectric actuator and the second effective cross-sectional area is mechanically coupled to the metering valve.

According to a third aspect, a metering valve is used for metered feeding of a fluid into a further volume.

An effective cross-sectional area is used by the stroke movement thereof in order to increase or reduce the size of the associated volume. From this is yielded an effective cross-sectional area made up of the quotient from change in volume divided by the stroke of the effective cross-sectional area.

In principle the variable first and second volumes may have been produced by a cylinder with piston or by bellows. When there is a change in temperature, the volume of the pistons or bellows may change in accordance with their volume expansion coefficient. In this case the enclosed fluid has a different volume expansion coefficient. Hydraulic oils used have a very high volume expansion coefficient. This leads to an undesired effect whereby the fluid expands more strongly than a piston or a bellows. As a result the oil needs more volume as the temperature increases and acquires the volume by an undesirable elongation of the pistons or bellows. This leads to an undesired leakage. This effect relates in essence to all the embodiment variants producing the first and second volume.

First and/or second displacement elements are incorporated in the first and/or second volume. A stroke transmitter described below includes only two volume enclosures, of the hydraulic oil and the displacement elements. The displacement elements are inserted into the volume enclosures and are characterized by a very low volume expansion coefficient. By a suitable combination of geometry and material the stroke transmitter remains neutral in terms of pressure when changes in temperature occur. For example, a buildup of heat due to an expansion of the volume enclosures results in exactly as much additional volume as fluid and displacement elements together need in order to expand. In this way a metering valve driven by a stroke transmitter remains as a whole free of pressure and closed. A possible determination of a volume of a displacement element is disclosed in connection with FIG. 4.

A stroke transmitter, which in particular transmits very small strokes, for example in the range of 1 µm to 500 µm, requires only small mechanical movements of its components. Such a stroke transmitter may have neither high friction losses nor corresponding signs of wear and tear as a result of abrasion. A stroke transmitter may be provided with suitably designed and selected displacement elements such that there is no change in the pressure conditions when there is a change in temperature. For this reason a constantly sufficient leak-tightness is desirable in a stroke transmitter when changes in temperature occur. A stroke transmitter therefore has the advantages that there is no possibility of fluidic friction in the stroke transmitter or of mechanical friction in the stroke transmitter, while pressure neutrality is maintained when changes in temperature occur, an idle stroke and hence a loss of actuator stroke are avoided, a hydraulic compensator is unnecessary, and continuous operation is made possible.

According to an advantageous embodiment, a product of volume and volume expansion coefficient of the overall housing may correspond to the sum of a product of volume and volume expansion coefficient of the fluid and of respective products of volume and volume expansion coefficient of all of the displacement elements.

According to a further advantageous embodiment, at least one section of the overall housing can additionally or alternatively be the at least one displacement element and the section can then be associated in terms of volume and volume expansion coefficient, not with the overall housing, but with the displacement elements.

According to a further advantageous embodiment, the first housing component can be produced by a first cylinder and a first piston guided therein and/or the second housing component can be produced by a second cylinder and a second piston guided therein.

According to a further advantageous embodiment, at least one of the two pistons can additionally or alternatively be the at least one displacement element and the piston can then be associated in terms of volume and volume expansion coefficient, not with the overall housing, but with the displacement elements.

According to a further advantageous embodiment, the first housing component can be produced by a first bellows and/or the second housing component can be produced by a second bellows.

According to a further advantageous embodiment, the material of displacement elements can be fused quartz glass, the material of an overall housing can be steel, and the fluid can be hydraulic oil.

According to a further advantageous embodiment, an extension of a displacement element along a direction of the stroke can extend beyond an extension of the associated bellows along the direction.

According to a further advantageous embodiment, respective extensions of a displacement element can be produced transversely to a direction of the stroke into concave protrusions of the associated bellows.

According to a further advantageous embodiment, the first effective cross-sectional area can be mechanically coupled to an actuator, and the second effective cross-sectional area can be mechanically coupled to the metering valve.

According to a further advantageous embodiment, the first effective cross-sectional area can be produced by a first piston and/or the second effective cross-sectional area by a second piston.

According to a further advantageous embodiment, the first effective cross-sectional area can delimit the first bellows at right angles to a direction of the stroke toward a piezoelectric actuator and/or the second effective cross-sectional area can delimit the second bellows at right angles to the direction of the stroke toward the metering valve.

According to a further advantageous embodiment, the second effective cross-sectional area can be mechanically coupled to a ball or a needle of the metering valve for the purpose of opening and closing the metering valve and/or can be mechanically coupled to the ball or needle.

According to a further advantageous embodiment, a return spring can be positioned between second effective cross-sectional area and the metering valve for the purpose of generating a counterforce against an increase in size of the second volume.

According to a further advantageous embodiment, a metering valve can be used for metered feeding of gas or gasoline into a combustion chamber.

BRIEF DESCRIPTION OF THE DRAWINGS

These and other aspects and advantages will become more apparent and more readily appreciated from the following description of the exemplary embodiments, taken in conjunction with the accompanying drawings of which.

DETAILED DESCRIPTION OF THE PREFERRED EMBODIMENT

Reference will now be made in detail to the preferred embodiments, examples of which are illustrated in the accompanying drawings, wherein like reference numerals refer to like elements throughout.

FIG. 1 shows an exemplary embodiment of a metering valve. FIG. 1 illustrates a functional principle of a metering valve in a schematic representation. A piston 3 having a surface area A1 is guided in a cylinder 2 and is driven directly by an actuator 1. A further piston 5 having a surface area A2 is connected to the valve needle 6. A volume 4 between the pistons is filled with a fluid, in most cases oil, and has a channel or connecting line having a throttling port 8. The throttling port 8 is integrated into the channel section in order to suppress vibrations. When the actuator 1 moves by a stroke x1, a specific fluid volume, namely x1*A1, is displaced by the piston 2, the fluid volume also moving the piston 5 through the bore by a stroke x2. The equation x2=x1*A1/A2 applies. A deflection amplification, that is to say a ratio of actuator stroke x1 to needle stroke x2, can be achieved as a function of the chosen area ratios. A large volume of fluid, in particular gas, can be metered quickly and precisely with the aid of a combination of a high-speed piezoelectric actuator 1 and the stroke transmitter concept according to FIG. 1. This requirement will become increasingly important in the future in the case of internal combustion engines that use for example gas or gasoline. For example, FIG. 1 shows a gas inlet labeled with reference sign 15, a combustion chamber labeled with reference sign reference sign 16, a metering valve labeled with reference sign reference sign 13, and the stroke transmitter labeled with reference sign 11. FIG. 1 shows an overall housing which externally delimits a total volume 4 made up of the sum of a first volume 4a and a second volume 4b. In this arrangement the overall housing is embodied by a first cylinder 2 and a first piston 3 guided therein and by a second cylinder 2a and a second piston 5 guided therein.

FIG. 2 shows a more detailed view of an exemplary embodiment of a stroke transmitter. A stroke transmitter concept is illustrated in greater detail in FIG. 2. A further connection bore 9 for producing a more rapid pressure equalization is shown in addition. The connection establishes a constant pressure in the connected chambers. This has the advantage that changes in length and volume caused by changes in temperature can be compensated for.

When an actuator 1 is actuated, the pressure in the chamber 4 increases and the piston 5 moves. On account of the operating principle of the system, oil is discharged through annular gaps. This leads to a diminishing volume over time and consequently to a loss of stroke, which is also referred to as "drift". A further disadvantage is the friction between the pistons 3 and 5 and the respective associated cylinders 2 and 2a. This friction leads on the one hand to a stroke loss and on the other hand a piston can "seize", which is to say it can become immovably jammed in the cylinder. Reference sign 7 designates an annular gap between piston 3 and cylinder 2. Reference sign 10 designates an annular gap between piston 5 and cylinder 2a. Reference sign 9 designates an additional connection bore for producing rapid pressure equalization. Reference sign 8 designates a throttling port (orifice) according to FIG. 1. The problems of such stroke transmitters are wear and tear and drift. It was possible to alleviate wear and tear in stroke transmitters and metering valves by coating contact surfaces, usually with diamond-like carbon (DLC). However, coating is an additional operation which is both time-consuming and expensive. Stroke loss due to gap flow cannot be eliminated using known techniques.

FIG. 3 shows a first exemplary embodiment of a metering valve. A possible design has for example two metal bellows 20 and 22 which are filled with a fluid and are connected by a throttling port 8. Reference sign 4 designates the sum of the respective internal spaces of the two bellows 20 and 22 and accordingly constitutes what is termed a hydraulic volume. When the actuator 1 is actuated and in so doing expands for example, the pressure in the first metal bellows 20 increases. The pressure is propagated by the throttling port 8 and causes the second metal bellows 22 to move a needle or ball against the force of a return spring 26 and thus open an injector. In the process the stroke of the actuator 1 is amplified in accordance with the cross-sections of the metal bellows 20 and 22. This arrangement therefore acts as a hydraulic stroke transmitter. Such an arrangement requires no moving piston and in this way circumvents friction problems associated therewith, as described hereinabove. A continuously open mode of operation is also possible with an arrangement of the type, since the pressure built up by the actuator 1 is sustained, and consequently no drift behavior is established. According to this embodiment variant of a stroke transmitter 11 for actuating a metering valve 13, which is based on the use of metal bellows 20 and 22 instead of metal cylinders and metal pistons, friction and drift characteristics no longer exist according to this concept.

Figure 4:
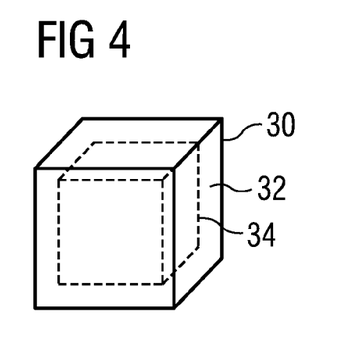
FIG. 4 a perspective view of cubes referenced in describing determination of a volume of a displacement element.

However, a concept of this type, as illustrated in FIG. 3, has a disadvantage of a change in temperature, such that undesired leakages can ensue. Accordingly, in addition to the fluid in the bellows 20 and 22 as well as in the connection line, a first displacement element and/or a second displacement element with respective displacement volume $V_V$ and respective volume expansion coefficient $\gamma_V$ are/is in each case incorporated into or positioned in an arrangement according to FIG. 3 in at least one of the bellows 20 and 22 in order to displace the fluid. In this way, for example, a stronger expansion of a fluid than the expansion of a housing of the first and/or second volume is compensated for in that a compensation element has a volume expansion coefficient which is so small that the expansion is compensated by the fluid. A precise calculation of these dependencies is shown in FIG. 4. FIG. 3 shows an overall housing which externally delimits a total volume 4 made up of the sum of a first volume 4a and a second volume 4b. In this arrangement the overall housing is embodied by a first bellows 20 and a second bellows 22. Accordingly, the total volume 4, which can also be referred to as the hydraulic volume, is the entire internal space of the two bellows 20 and 22 combined.

FIG. 4 shows an exemplary embodiment of determination of the volume of a respective displacement element. FIG. 4 shows a self-contained system which is composed of three materials and which can always be designed in such a way that it remains free of pressure or free of stresses when changes in temperature occur. In this case reference sign 30 designates a housing, reference sign 32 designates a fluid, and reference sign 34 designates a displacement element. A first or second volume can essentially be provided as desired by a housing 30. The embodiments of the housing are particularly advantageously in the form of pistons or bellows. A particularly advantageous housing material is in particular steel. Other metals can also be used. Based on subsequent calculations the fluid 32 is particularly advantageously a hydraulic oil and the material of the displacement element 34 is particularly advantageously glass, in particular fused quartz glass. The basis for the calculation and the choice of materials based thereon is the following compensation condition for a change in temperature ΔT:

$$V_B \gamma_B \Delta T = V_F \gamma_F \Delta T + V_V \gamma_V \Delta T \qquad (0)$$

The displacement element volume is therefore calculated as $$V_V = (V_B \gamma_B - V_F \gamma_F)/\gamma_V \qquad (1)$$

$V_B$=volume of bellows
$V_F$=volume of fluid
$V_V$=volume of displacement element
$\gamma_B$=volume expansion coefficient
$\gamma_F$=volume expansion coefficient of fluid
$\gamma_V$=volume expansion coefficient of displacement element Examples of Suitable Volume Expansion Coefficients:

Fluids such as the silicone oils mainly employed in metering valves have a volume expansion coefficient $\gamma$ of typically 500 . . . $1000 \cdot 10^{-6}$/K. That is very large compared to steel, which is generally used as housing material.

Steel as a typical housing material has $\gamma=30\text{-}48*10^{-6}$/K

Displacement elements should have a small volume expansion coefficient. This is satisfied by glass for example with $\gamma=1.5\text{-}3*10^{-6}$/K. The first and the second volume may be provided by a housing 30. Pistons or bellows can be particularly advantageous embodiments of housings 30. A fluid for a stroke transmitter may be, for example, hydraulic oil. According to a derivation as illustrated in FIG. 4, fused quartz glass is suitable in particular as a material for a first displacement element in the first volume and/or the second displacement element in the associated second volume.

Figure 5:
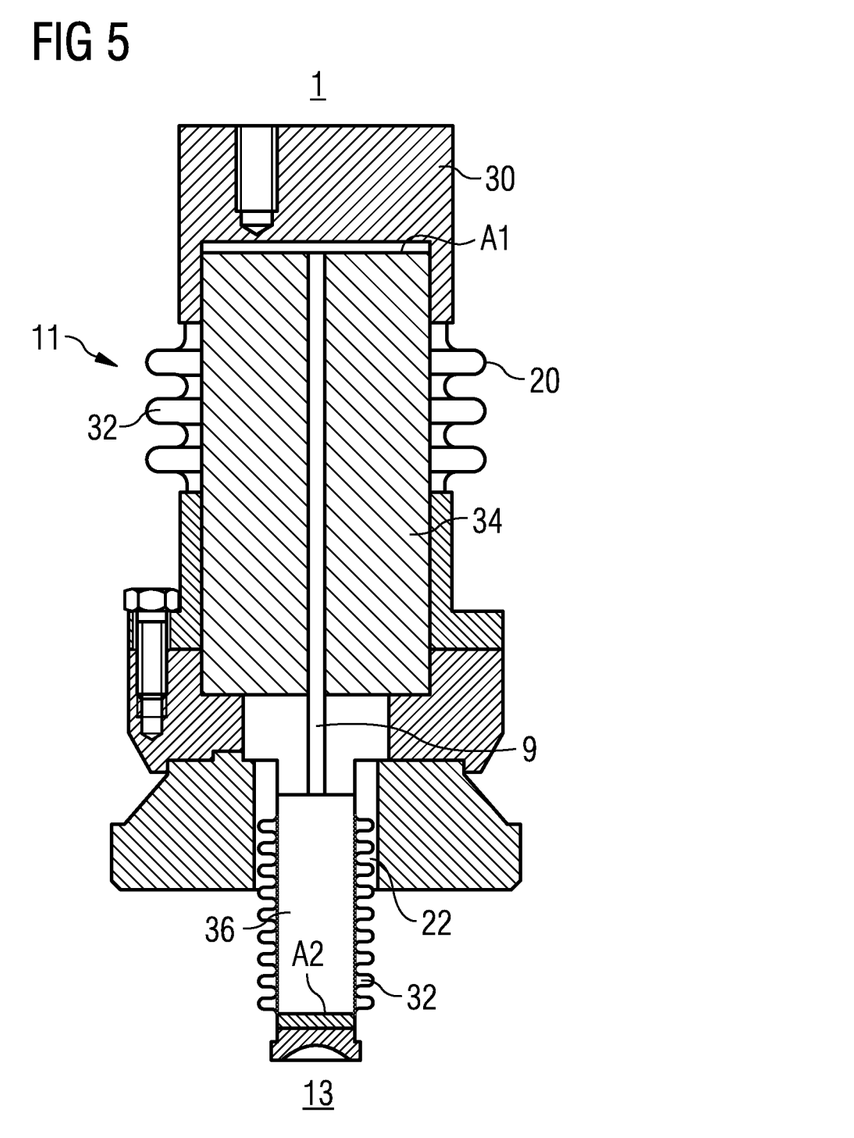
FIG. 5 is a cross section of an exemplary embodiment of a stroke transmitter.

FIG. 5 shows an exemplary embodiment of a stroke transmitter 11. Reference sign 30 designates a housing in which are integrated in particular a first bellows 20 and a displacement element 34. A connection bore 9 leads from the first volume to the second volume, that is to say from the first bellows 20 to the second bellows 22. A second displacement element 36 is integrated in the second volume produced by the second bellows 22. In order to satisfy the equations (0) and (1), the first displacement element 34 and its volume are sufficiently large to ensure that the first volume is almost entirely filled by the first displacement element 34. However, the associated fluid 32 is effectively present. In other words, all the conditions according to the calculation as illustrated in FIG. 4 are fulfilled in the upper first volume and the lower second volume of FIG. 5. The first volume in FIG. 5 is provided by the housing 30 and the first bellows. The lower second volume is provided by the second bellows 22. According to FIG. 5, the extension of the upper displacement element 34 extends along the direction of a stroke beyond the extension of the associated bellows 20 along the direction. Furthermore, respective extensions of the first displacement element 34 are produced transversely to the direction of a stroke into concave protrusions of the associated bellows 20. A stroke is effected in the axial direction of the first displacement element 34 and of the second displacement element 36. In order to implement a metering valve by the stroke transmitter 11 according to FIG. 5, an upper first effective cross-sectional area is mechanically connected to an actuator 1 and a second effective cross-sectional area is mechanically connected to a lower metering valve 13. An advantageous embodiment variant of an actuator 1 is a piezoelectric actuator.

The strokes of the effective cross-sectional areas lie for example in the micrometer range. In this way only very small corresponding displacements of the effective cross-sectional areas take place in axial directions of the bellows. This enables stroke transmitters to be referred to also as virtually mechanically motionless. Furthermore, combinations of bellows with cylinder-piston systems are possible. For example, a first housing component can be produced by a piston guided in a cylinder and a second housing component can be produced by a bellows, wherein a first displacement element can then be the piston associated with the cylinder and a second displacement element can be positioned in the bellows.

FIG. 5 taken in conjunction with FIG. 3 shows a first volume 4a which is variable by a first effective cross-sectional area A1 and which is enclosed by a first housing component 20, and a second volume 4b which is variable by a second effective cross-sectional area A2 and which is enclosed by a second housing component 22, the volumes being filled with a fluid 32 and produced in a fluid exchange with one another by a throttling port 8 in such a way that a stroke of the second effective cross-sectional area A2 corresponds to the product of a stroke of the first effective cross-sectional area A1 with a ratio formed from the first effective cross-sectional area A1 to the second effective cross-sectional area A2. A total volume 4 made up of the sum of first volume 4a and second volume 4b is delimited externally by an overall housing. First housing component 20 and second housing component 22 produce the overall housing. In addition a line of the throttling port 8 can also be taken into account. Two displacement elements 34 and 36 are positioned in the total volume 4. The overall housing 20 and 22, the fluid 32 and all of the displacement elements 34 and 36 are coordinated to complement one another in such a way that a change in volume of the overall housing 20 and 22 caused by a change in temperature corresponds to a combined change in volume of the fluid 32 and of all of the displacement elements, and specifically 34 and 36 in this case, brought about as a result of the change in temperature.

FIG. 4 taken in conjunction with FIG. 2 shows that instead of bellows, pistons 3 and 5 in cylinders 2 and 2a are equally suitable as an embodiment variant. The first housing component can then be produced for example by a first cylinder 2 and a first piston 3 guided therein, and/or the second housing component can be produced by a second cylinder 2a and a second piston 5 guided therein. A displacement element (not shown in FIG. 2) can for example be incorporated in the first volume 4a. Furthermore, at least one of the two pistons 3 and 5 can additionally or alternatively be the at least one displacement element, in which case the piston is then associated in terms of volume and volume expansion coefficient, not with the overall housing, but with the displacement elements. In other words, a piston 3 can, according to this embodiment variant, additionally take on the function of a displacement element. In a coordinated arrangement, the overall housing would for example expand strongly in the event of a temperature increase, while the piston 3 would expand only to a limited extent. An oil contained in the total volume 4 can then expand without an increase in pressure.

A description has been provided with particular reference to preferred embodiments thereof and examples, but it will be understood that variations and modifications can be effected within the spirit and scope of the claims which may include the phrase "at least one of A, B and C" as an alternative expression that means one or more of A, B and C may be used, contrary to the holding in *Superguide v. DIRECTV*, 358 F3d 870, 69 USPQ2d 1865 (Fed. Cir. 2004).

The invention claimed is:

1. A stroke transmitter, comprising:
    an overall housing having
        a first housing component enclosing a first volume which is variable by displacement of a first effective cross-sectional area and which is filled with a fluid, and
        a second housing component enclosing a second volume which is variable by displacement of a second effective cross-sectional area and which is filled with the fluid, the overall housing externally delimiting a total volume equal to a first sum of the first and second volumes;
a throttling port permitting fluid exchange between the first and second volumes, where a first product formed by a first stroke of the first effective cross-sectional area times a ratio of the first effective cross-sectional area to the second effective cross-sectional area corresponds to a second stroke of the second effective cross-sectional area; and
at least one displacement element positioned in the total volume, where the overall housing, the fluid and the at least one displacement element are coordinated to complement one another so that a change in the total volume of the overall housing caused by a change in temperature corresponds to a combined change in fluid volume and at least one displacement element volume caused by the change in temperature.

2. The stroke transmitter as claimed in claim 1, wherein at least one of the first and second housing components is formed by a bellows.

3. The stroke transmitter as claimed in claim 2, wherein an extension of at least one of the at least one displacement element along one direction of a displacement stroke extends beyond an extension of an associated bellows along the one direction.

4. The stroke transmitter as claimed in claim 2,
wherein the bellows has concave protrusions, and
wherein respective extensions of a displacement element are produced transversely to a direction of the stroke into the concave protrusions of the bellows associated therewith.

5. The stroke transmitter as claimed in claim 1, wherein a second product of the total volume times an overall housing volume expansion coefficient corresponds to a second sum of a third product of the fluid volume times a fluid volume expansion coefficient plus respective products of a displacement element volume and a displacement element volume expansion coefficient for each of the displacement elements.

6. The stroke transmitter as claimed in claim 5, wherein at least one section of the overall housing is the at least one displacement element and a section volume of the at least one section is not included in an overall housing volume.

7. The stroke transmitter as claimed in claim 6, wherein the at least one displacement element includes fused quartz glass, the overall housing includes steel, and the fluid is hydraulic oil.

8. The stroke transmitter as claimed in claim 6, wherein at least one of the first and second housing components is formed by a cylinder with a piston guided therein.

9. The stroke transmitter as claimed in claim 8,
wherein the first and second housing components are formed by two cylinders and two pistons, and
wherein the at least one displacement element corresponds to at least one of the two pistons.

10. A metering valve having a stroke transmitter as claimed in claim 1, wherein the first effective cross-sectional area is mechanically coupled to an actuator and the second effective cross-sectional area is mechanically coupled to the metering valve.

11. The metering valve as claimed in claim 10, wherein at least one of the first and second effective cross-sectional areas is defined by a head of a piston.

12. The metering valve as claimed in claim 10, wherein the first effective cross-sectional area delimits a first bellows at right angles to a direction of the stroke toward a piezo-electric actuator and/or the second effective cross-sectional area delimits a second bellows at right angles to the direction of the stroke toward the metering valve.

13. The metering valve as claimed in claim 10, further comprising one of a ball and a needle, mechanically coupled to the second effective cross-sectional area, opening and closing the metering valve.

14. The metering valve as claimed in claim 10, further comprising a return spring, positioned between the second effective cross-sectional area and the metering valve, generating a counterforce against an increase in size of the second volume.

15. The metering valve as claimed in claim 10, wherein the fluid is metered into a further volume.

16. The metering valve as claimed in claim 15, wherein the fluid is a gas or gasoline metered into a combustion chamber.

17. A stroke transmitter, comprising:
an overall housing having
a first housing component enclosing a first volume which is variable by displacement of a first effective cross-sectional area and which is filled with a fluid, and
a second housing component enclosing a second volume which is variable by displacement of a second effective cross-sectional area and which is filled with the fluid, the overall housing externally delimiting a total volume equal to a first sum of the first and second volumes, at least one of the first and second housing components being formed by a bellows;
a throttling port permitting fluid exchange between the first and second volumes, where a first product formed by a first stroke of the first effective cross-sectional area times a ratio of the first effective cross-sectional area to the second effective cross-sectional area corresponds to a second stroke of the second effective cross-sectional area; and
at least one displacement element positioned in the total volume and having an extension along one direction of a displacement stroke extending beyond an extension of an associated bellows along the one direction, where the overall housing, the fluid and the at least one displacement element are coordinated to complement one another so that a change in the total volume of the overall housing caused by a change in temperature corresponds to a combined change in fluid volume and at least one displacement element volume caused by the change in temperature.

18. A stroke transmitter, comprising:
an overall housing formed of at least steel and having
a first housing component enclosing a first volume which is variable by displacement of a first effective cross-sectional area and which is filled with hydraulic oil, and
a second housing component enclosing a second volume which is variable by displacement of a second effective cross-sectional area and which is filled with the hydraulic oil, the overall housing externally delimiting a total volume equal to a first sum of the first and second volumes;
a throttling port permitting fluid exchange between the first and second volumes, where a first product formed by a first stroke of the first effective cross-sectional area times a ratio of the first effective cross-sectional area to the second effective cross-sectional area corresponds to a second stroke of the second effective cross-sectional area; and at least one displacement element including fused quartz glass, positioned in the total volume and having an extension along one direction of a displacement stroke extending beyond an extension of an associated bellows along the one direction, where the overall housing, the fluid and the at least one displacement element are coordinated to complement one another so that a change in the total volume of the overall housing caused by a change in temperature corresponds to a combined change in fluid volume and at least one displacement element volume caused by the change in temperature.

19. A stroke transmitter, comprising:

an overall housing having a first housing component enclosing a first volume which is variable by displacement of a first effective cross-sectional area and which is filled with a fluid, and a second housing component enclosing a second volume which is variable by displacement of a second effective cross-sectional area and which is filled with the fluid, the overall housing externally delimiting a total volume equal to a first sum of the first and second volumes, at least one of the first and second housing components being formed by a bellows having concave protrusions;

a throttling port permitting fluid exchange between the first and second volumes, where a first product formed by a first stroke of the first effective cross-sectional area times a ratio of the first effective cross-sectional area to the second effective cross-sectional area corresponds to a second stroke of the second effective cross-sectional area; and at least one displacement element positioned in the total volume having respective extensions produced transversely to a direction of at least one of the first and second stroke into the concave protrusions of the bellows associated therewith, where the overall housing, the fluid and the at least one displacement element are coordinated to complement one another so that a change in the total volume of the overall housing caused by a change in temperature corresponds to a combined change in fluid volume and at least one displacement element volume caused by the change in temperature.

20. The stroke transmitter as claimed in claim 19, wherein the at least one displacement element includes fused quartz glass, the overall housing includes steel, and the fluid is hydraulic oil.

21. A stroke transmitter, comprising:

an overall housing having a first housing component enclosing a first volume which is variable by displacement of a first effective cross-sectional area and which is filled with a fluid, and a second housing component enclosing a second volume which is variable by displacement of a second effective cross-sectional area and which is filled with the fluid, the overall housing externally delimiting a total volume equal to a first sum of the first and second volumes, at least one of the first and second housing components being formed by a bellows having concave protrusions;

a throttling port permitting fluid exchange between the first and second volumes, where a first product formed by a first stroke of the first effective cross-sectional area times a ratio of the first effective cross-sectional area to the second effective cross-sectional area corresponds to a second stroke of the second effective cross-sectional area; and at least one displacement element positioned in the total volume and having an extension along one direction of a displacement stroke extending into the concave protrusions of the associated bellows and beyond an extension of an associated bellows along the one direction, where the overall housing, the fluid and the at least one displacement element are coordinated to complement one another so that a change in the total volume of the overall housing caused by a change in temperature corresponds to a combined change in fluid volume and at least one displacement element volume caused by the change in temperature.

22. The stroke transmitter as claimed in claim 21, wherein the at least one displacement element includes fused quartz glass, the overall housing includes steel, and the fluid is hydraulic oil.

* * * * *